US009027964B2

(12) United States Patent
Neero et al.

(10) Patent No.: US 9,027,964 B2
(45) Date of Patent: May 12, 2015

(54) HEIGHT ADJUSTER FOR A FASTENING FITTING OF A SAFETY BELT SYSTEM

(75) Inventors: Peter Neero, Viimsi (EE); Aivo Kees, Tallinn (EE); Larissa Melnikova, Tallinn (EE)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 14/005,005

(22) PCT Filed: Feb. 25, 2012

(86) PCT No.: PCT/EP2012/000857
§ 371 (c)(1),
(2), (4) Date: Oct. 31, 2013

(87) PCT Pub. No.: WO2012/123068
PCT Pub. Date: Sep. 20, 2012

(65) Prior Publication Data
US 2014/0042282 A1    Feb. 13, 2014

(30) Foreign Application Priority Data

Mar. 16, 2011  (DE) .................. 10 2011 014 175

(51) Int. Cl.
*B60R 22/20* (2006.01)
(52) U.S. Cl.
CPC ............. *B60R 22/202* (2013.01); *B60R 22/203* (2013.01)
(58) Field of Classification Search
CPC ...... B60R 22/24; B60R 22/20; B60R 22/201; B60R 22/202; B60R 22/203

USPC ................................................ 280/801.2, 804
See application file for complete search history.

(56) References Cited

U.S. PATENT DOCUMENTS

| 4,564,219 | A | * | 1/1986 | Baden et al. | ................ | 280/801.2 |
| RE32,448 | E | * | 6/1987 | Anderson | ..................... | 280/808 |
| 4,989,900 | A | * | 2/1991 | Steinhuser | ..................... | 280/808 |
| 5,265,908 | A | * | 11/1993 | Verellen et al. | ............ | 280/801.2 |
| 5,366,243 | A | * | 11/1994 | Ray et al. | .................... | 280/801.2 |
| 5,758,901 | A | * | 6/1998 | Harenberg | ................. | 280/801.2 |

(Continued)

FOREIGN PATENT DOCUMENTS

DE    31 39 419 A1    4/1983
DE    43 08 366 A1    9/1993
(Continued)

OTHER PUBLICATIONS

German Examination Report—Nov. 14, 2011.
(Continued)

*Primary Examiner* — Nicole Verley
(74) *Attorney, Agent, or Firm* — Brinks Gilson & Lione

(57) ABSTRACT

A height adjuster (1) for a bracket of a safety belt for a motor vehicle includes a profiled rail (2) a base (22) and side walls (11, 12), wherein in at least one side wall (11, 12) a latching contour (14, 15) is provided, a sliding member (16) which can be displaced along the profiled rail (2) and includes a latching means for latching the sliding member (16) in the latching contour (14, 15), and a control element (3) for releasing the latching means. At least one recess (21) is provided at a side edge of the sliding member (16) and the latching means is formed by at least one latching element (4, 5) located in the recess (21).

10 Claims, 5 Drawing Sheets

(56) References Cited

U.S. PATENT DOCUMENTS

| | | | | |
|---|---|---|---|---|
| 5,857,704 | A | * | 1/1999 | Biller .......................... 280/801.2 |
| 5,860,675 | A | * | 1/1999 | Muller et al. ............... 280/801.2 |
| 5,911,439 | A | * | 6/1999 | Pleyer et al. ................ 280/801.2 |
| 5,924,731 | A | * | 7/1999 | Sayles et al. .................. 280/807 |
| 5,931,502 | A | * | 8/1999 | Frank et al. ................ 280/801.2 |
| 5,941,566 | A | * | 8/1999 | Holzapfel et al. ......... 280/801.2 |
| 6,135,499 | A | * | 10/2000 | Holzapfel et al. ......... 280/801.2 |
| 6,334,629 | B1 | * | 1/2002 | Griesemer et al. ......... 280/801.2 |
| 7,543,852 | B2 | * | 6/2009 | Murthy et al. ............. 280/801.2 |
| 2005/0189758 | A1 | * | 9/2005 | Zierle et al. ................ 280/801.2 |

FOREIGN PATENT DOCUMENTS

| | | | | |
|---|---|---|---|---|
| DE | 102007026127 | A1 | * 12/2008 | .............. B60R 22/20 |
| DE | 10 2008 052 850 | A1 | 4/2010 | |
| DE | 102011111781 | A1 | * 3/2013 | ............ B60R 22/203 |
| DE | 102012200061 | A1 | * 7/2013 | |
| EP | 0086633 | A2 | * 8/1983 | .............. B60R 22/20 |
| EP | 0 800 968 | A2 | 10/1997 | |
| GB | 2213040 | A | * 8/1989 | .............. B60R 22/20 |

OTHER PUBLICATIONS

PCT International Search Report—Jun. 16, 2012.

* cited by examiner

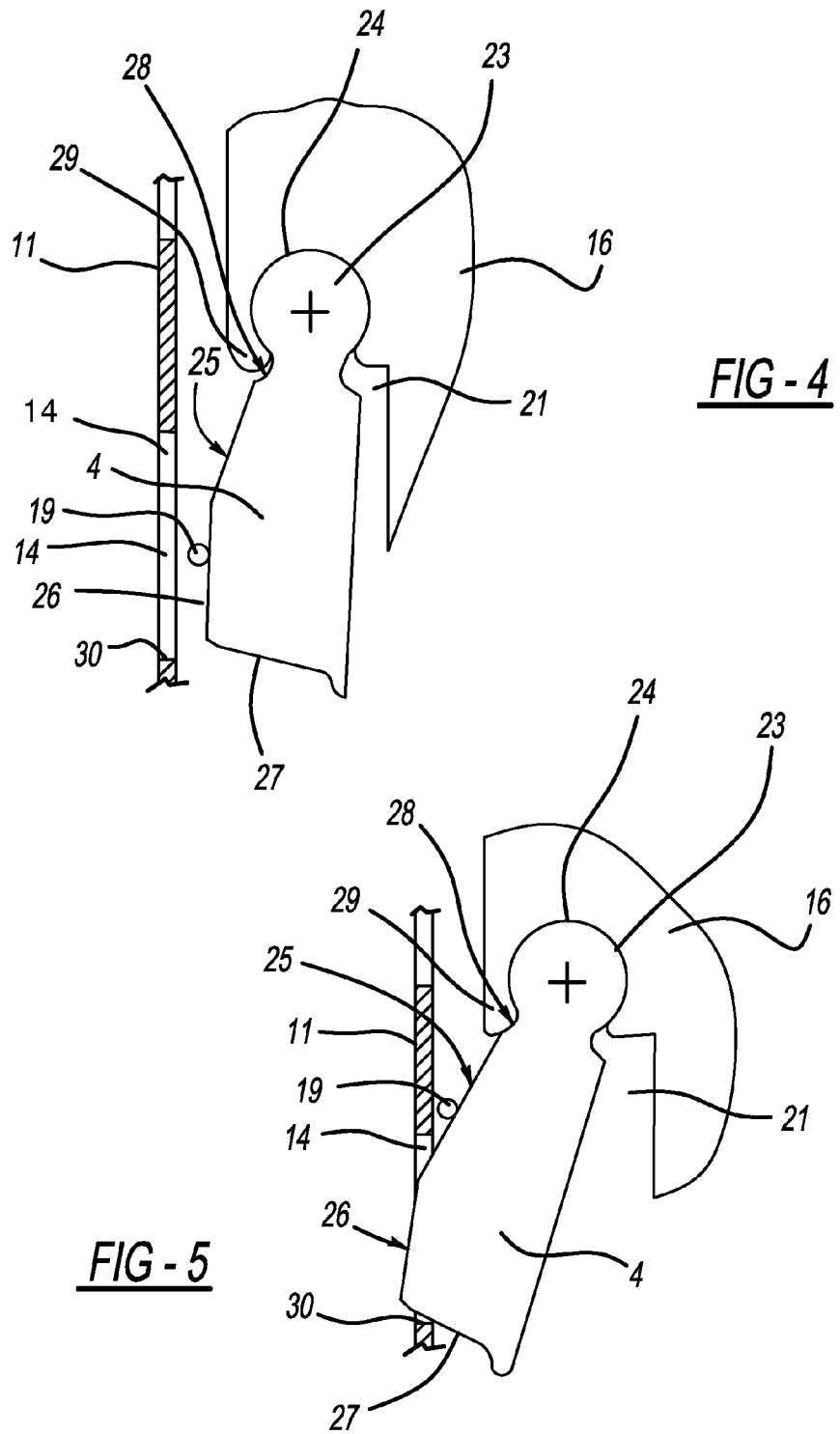

HEIGHT ADJUSTER FOR A FASTENING FITTING OF A SAFETY BELT SYSTEM

CROSS REFERENCE TO RELATED APPLICATIONS

This application claims priority to German Patent Application No. 10 2011 014 175.8, filed Mar. 16, 2011 and PCT/EP2012/000857, filed Feb. 25, 2012.

FIELD OF THE INVENTION

The invention relates to a height adjuster for a bracket of a safety belt system for a motor vehicle.

BACKGROUND

A generic height adjuster is known for example from DE 10 2008 052 850 A1. The height adjuster has a profiled rail consisting of a base and two side walls extending upwards from the edges of the base which at their free edges in turn are bent towards the base. The profiled rail thus forms a profile having a C-shaped cross section which is constricted by the bent edges. Furthermore, a sliding member is provided which can be displaced within the profiled rail and forms a mounting bore for a bracket, and is fixed at the profiled rail via the bent edges in the tension direction of a fastening means provided between the mounting bracket and the sliding member. In the side walls of the profiled rail, a latching contour in the form of regularly spaced windows is provided which enables the sliding member and thus the bracket to be fixed at various heights. For fixing the sliding member in relation to the profiled rail, two latching elements protruding from both sides are provided on the sliding member, which in an unoperated position engage into the windows in a form 11 closed manner and thereby fix the sliding member in such a way that it cannot be displaced. Moreover, an actuating element is provided which is secured on the sliding member via a screw and upon actuation, pushes the latching elements out of the locking position, so that they no longer engage into the windows and the sliding member with the bracket attached thereto subsequently can be displaced in relation to the vehicle-fixed profiled rail. In order that both latching elements can be released simultaneously, an actuating element is provided which extends in between the symmetrically located latching elements and upon actuation abuts against one of the latching elements on each side.

The latching elements are mounted on a bearing flange of the sliding member one on top of the other, whereby the total height of the sliding member together with the latching elements, and thus the installation space, are increased. As a result, also the height adjuster has a greater total height, so that between the attachment point at the vehicle structure and the interior trim covering the same, a large free space needs to be provided. However, if the free space available at the attachment point is limited, it may be a problem to attach such a height adjuster to the motor vehicle.

It is the object of the invention to provide a height adjuster having a total height which is as low as possible.

For the solution of the object a height adjuster in accordance with this invention is proposed. Further preferred features of the invention can be taken from the figures and the related description.

According to one aspect of the invention, it is proposed that at least one recess is provided at a side edge of the sliding member, and that the latching means is formed by at least one latching pawl which is located in the recess. Owing to the provided recess for mounting the latching pawl, the same can be integrated into the sliding member in a manner that is optimized with respect to the installation space, resulting in a reduction of the installation space at least by the volume of the latching pawl which is mounted in the recess. Thereby, in particular the total height of the unit consisting of the sliding member and the latching element can be reduced, as the latching element does no longer heighten the total height by being located on the sliding member. Thereby, both the profiled rail and the entire height adjuster can have a flatter design.

It is further proposed in accordance with this invention that the sliding member in the region of the recess is preferably plate-shaped having a thickness $D1$ and the latching pawl is plate-shaped having a thickness $D2$ which is equal to or smaller than the thickness $D1$. By dimensioning the latching element as proposed, the same can be located completely within the outer dimensions of the sliding member, so that it at least does not heighten the total height.

The latching pawl is preferably pivot-mounted in the recess. Due to the pivot bearing being realized in the recess and thus in the level of the sliding member or the profiled rail, the total height is not increased by the pivot bearing. The pivot bearing can preferably be realized by the latching pawl forming a pivot tab and the recess acting as a constricted bearing, with the latching pawl being pivot-mounted in the bearing by the pivot tab. The bearing flange protruding from the level of the sliding member or the profiled rail as known from the prior art can then be dispensed with.

BRIEF DESCRIPTION OF THE DRAWINGS

In the following, the invention will be described in more detail on the basis of preferred embodiments with reference to the attached figures. The figures show:

FIG. 4 is a detailed cross-sectional view of a height adjuster in accordance with the present invention in the region of the latching means in the released state;

FIG. 5 is a detailed cross-sectional view of a height adjuster in accordance with the present invention in the region of the latching means in the latched state.

DETAILED DESCRIPTION

Figure 1:
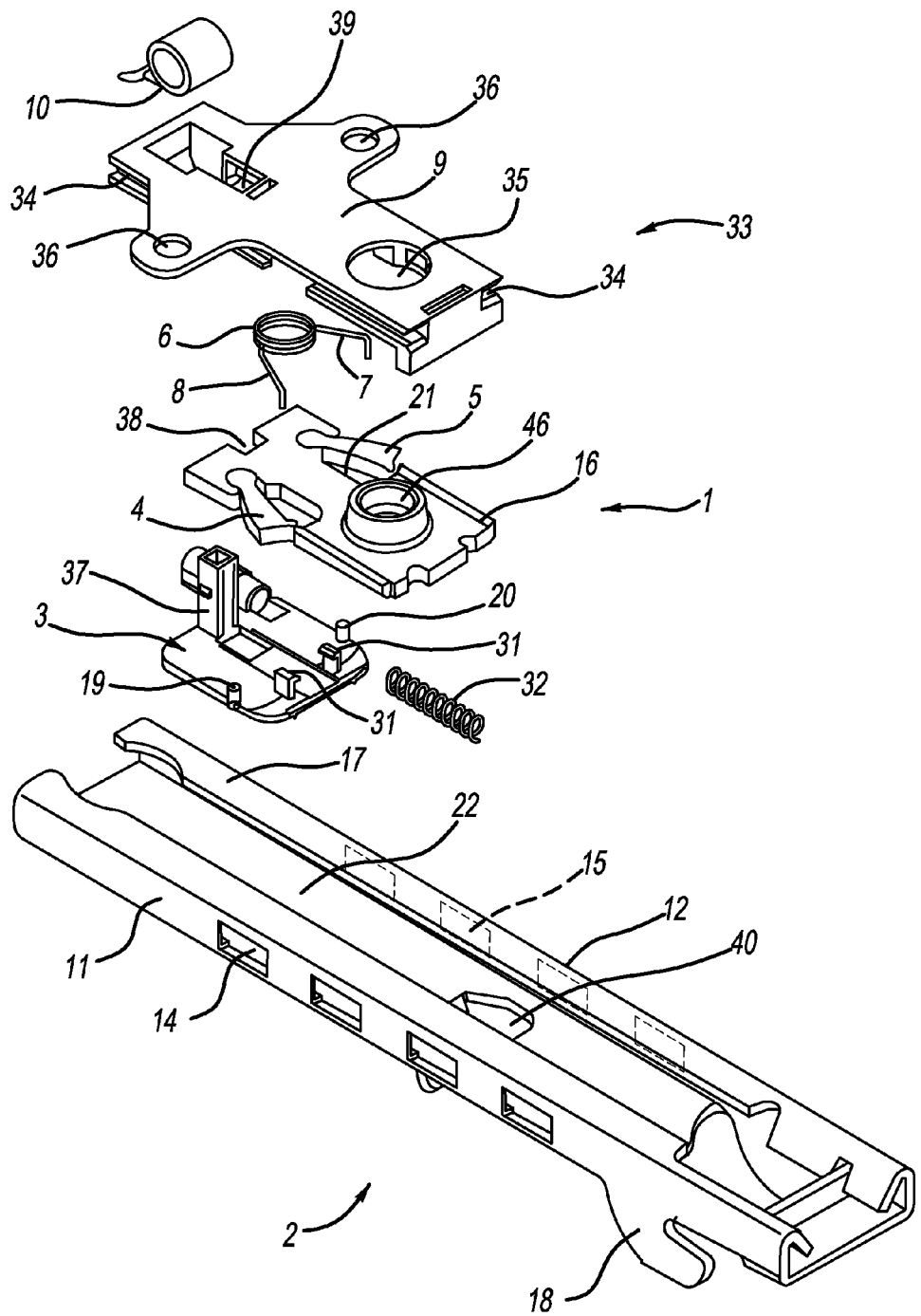
FIG. 1 is a perspective exploded view of a height adjuster in accordance with the present invention.

The height adjuster 1 includes a profiled rail 2 having a U-shaped or C-shaped cross section and comprising a base 22 and laterally protruding opposite side walls 11, 12. In each side wall 11, 12 a respective latching contour 14, 15 in particular in the form of latching windows is provided. The height adjuster 1 further includes a slide 33 which is displaceably guided in the profiled rail 2 and in particular includes a sliding member 16, a control element 3, and a guide member 9. Sliding member 16, control element 3 and/or guide member 9 are preferably essentially plate-shaped. The profiled rail 2 includes suitable elements 18, 40 for attaching the profiled rail 2 to the vehicle structure, for example to the B-pillar of a motor vehicle. The advantageous mounting element 40 allows an additional attachment in the center of the profiled rail 2.

The guide member 9 is displaceably guided in the profiled rail 2. For this purpose, guide means acting between the profiled rail 2 and the guide member 9 are provided. In the present embodiment, the guide means are formed by U profiles 34 provided at the longitudinal sides of the guide member 9 and legs 17 provided at the side walls 11, 12 of the profiled rail 2 which preferably run parallel to the base 22 and engage into the U profiles 34. The guide member 9 can comprise for example one or more bores 36 for mounting a bracket of a safety belt, for example a belt deflector. A spring 10 acting in particular between the profiled rail 2 and the guide member 9 exerts a force onto the slide 33 which is directed opposite to the weight of the slide 33 and the belt part attached thereto, in order to facilitate a displacement of the slide 33 for the vehicle occupant.

The sliding member 16 includes a latching means in the form of latching elements 4, 5 for latching both sides of the sliding member 16 in the latching contours 14, 15 of the side walls 11, 12 of the profiled rail 2, as will be described below in more detail. The sliding member 16 preferably is a separate component which is connected to the guide member 9 in such a way that it cannot be displaced for example via a flange 46 engaging into an opening 35 of the guide member 9 or via other suitable means. The sliding member 16 is preferably located between the guide member 9 and the base 22 of the profiled rail 2. In a not shown embodiment, guide member 9 and sliding member 16 can also be formed as one piece.

Figure 3:
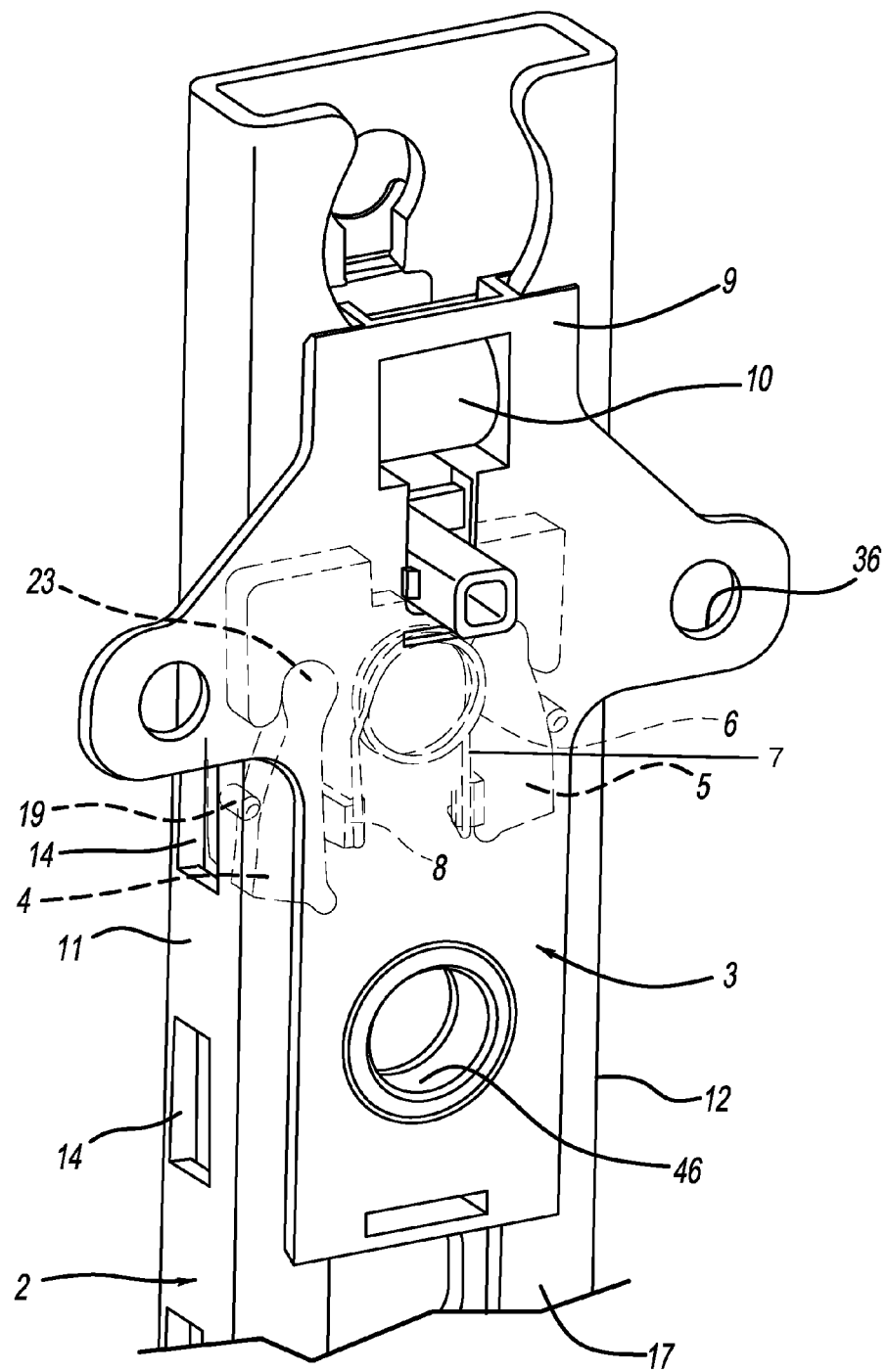
FIG. 3 is a perspective view of a height adjuster in accordance with the present invention in the latched state.
Figure 6:
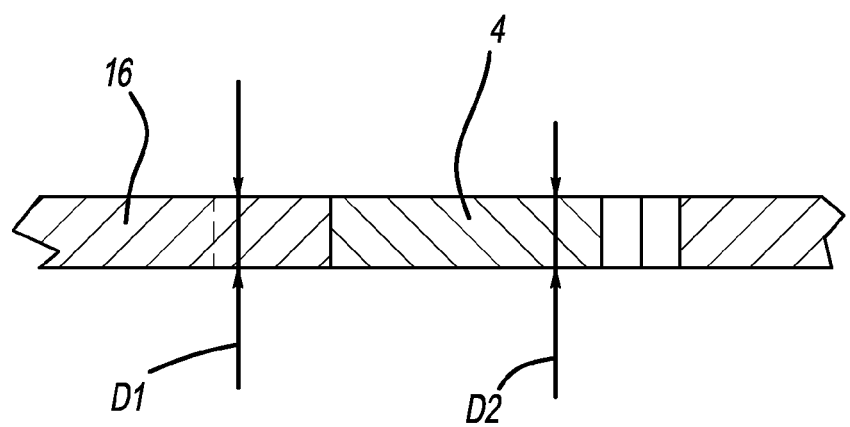
FIG. 6 is a cross-sectional view of a cut-out of a sliding member.

The latching elements 4, 5 are particularly designed as latching pawls. The latching pawls 4, 5 are preferably located in the level of the sliding member 16 and in the released state according to FIGS. 3 and 4 are received in corresponding lateral recesses 21 at the side edges of the sliding member. In this state, the slide 33 and together therewith the belt bracket can be displaced freely along the profiled rail 2. As can be seen in FIG. 6, the thickness D2 of the particularly plate-shaped latching pawls 4, 5 is smaller than or equal to the thickness D1 of the particularly plate-shaped sliding member 16, resulting in an advantageous minimization of the total height.

Figure 2:
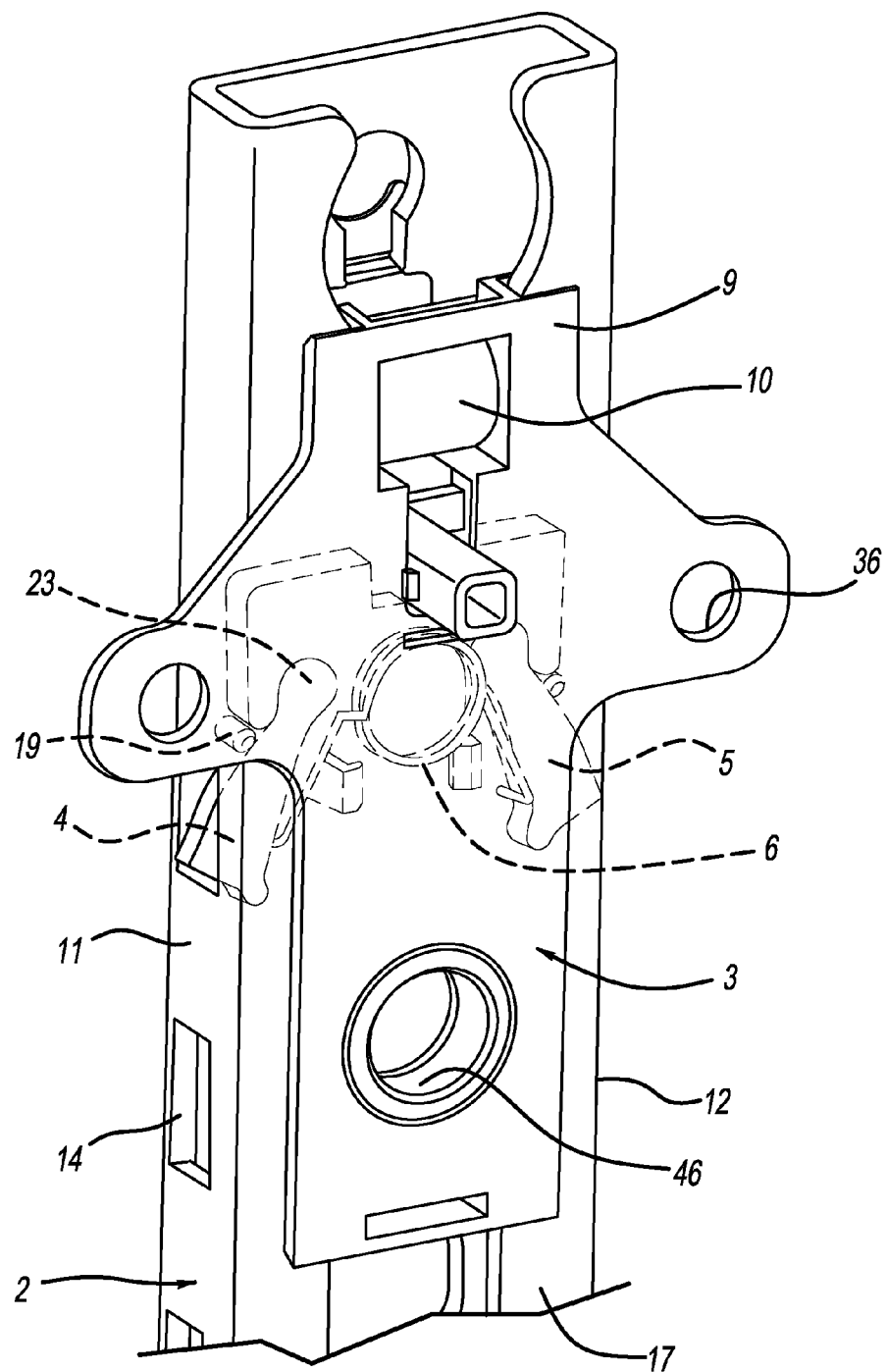
FIG. 2 is a perspective view of a height adjuster in accordance with the present invention in the released state.

The latching pawls 4, 5 can be swiveled relative to the sliding member 16 between the released position according to FIGS. 3 and 4, and the latching position according to FIGS. 2 and 5. For this purpose, each latching pawl 4, 5 preferably comprises a pivot tab 23 which is pivot-mounted in a corresponding constricted bearing 24 of the respective recess 21 of the sliding member.

The latching pawls 4, 5 are pre-loaded in the latching direction by a spring 6. The spring 6 is preferably a torsion spring or leg spring 6 which is torsionally loaded around its axis and comprises two radially projecting legs 7, 8, each of which abuts against one latching pawl 4, 5. Owing to the spring 6, the latching pawls 4, 5 normally are in the latched state, in which the latching pawls 4, 5 engage into the windows 14, 15 provided in the side walls 11, 12 of the profiled rail 2 and prevent an unintentional displacement of the slide 33, so that the belt bracket attached to the slide 33 during driving at any time takes a defined vertical position. In the latching position, the latching pawls 4, 5 with a corresponding surface 28 advantageously abut against an edge 29 of the respective recess 21 in a force-transmitting manner. Furthermore, the latching pawls 4, 5 can comprise a surface 27 which in the latching position abuts against an edge 30 of the respective latching window 14.

The control element 3 serves to control or release the latching means as a result of being actuated by an occupant. For this purpose, the control element 3 is guided displaceably relative to the sliding member 16, for example via hook-shaped elements 31 which are guided along the inner surface of the recesses 21, see FIG. 1. The control element 3 comprises a for example pin-shaped actuating element 37 which is preferably formed as one piece with the control element 3. The control element 3 is pre-loaded against the sliding member 16 in the latching direction by a compression spring 32, in order to prevent an unintentional displacement of the slide 33.

Projections 19, 20 are further provided on the control element 3 which work together with corresponding contact surfaces 25 having an inclined orientation with respect to the displacing direction of the control element 3. Owing to the control element 3 being displaced upon actuation of the actuating element 37 against the force of the compression spring 32, the latching pawls 4, 5 by the projections 19, 20 are thus pushed into the recesses 21 against the force of the leg spring 6 and are disengaged from the latching windows 14, 15 and thus are swiveled to the released position. Each of the latching pawls 4, 5 preferably comprises a surface 26 which in the released position runs approximately parallel to the displacing direction of the control element 3, so that upon a further displacement of the control element 3 the latching pawls 4, 5 are not swiveled any further.

The control element 3 is preferably located between the sliding member 16 and the base 22 of the profiled rail 2. Furthermore, the control element 3 and the sliding member 16 are preferably located between the base 22 of the profiled rail 2 and the guide member 9. Owing to the control element 3 being preferably located internally, it is dispensable to secure the control element 3 on the sliding member 16 for example via a screw, as known from the prior art. The control element 3 and/or the guide member 9 preferably form corresponding pass-through openings 38, 39 for the actuating element 37, in order to allow the actuating element 37 to be passed through to the outside and thus to be actuated by the occupant. In particular the pass-through opening 39 of the guide member 9 in view of the displaceability of the control element 3 relative to the guide member 9 as described above is expediently formed as a long hole.

The above embodiments describe an advantageous latching of both sides of the sliding member 16 via two latching pawls 4, 5, each of which is located in a respective recess 21. However, a one side-latching latching means having in particular one latching pawl 4 only, which is located in a recess 21, is also possible.

While the above description constitutes the preferred embodiment of the present invention, it will be appreciated that the invention is susceptible to modification, variation and change without departing from the proper scope and fair meaning of the accompanying claims.

The invention claimed is:

1. A height adjuster for a bracket of a safety belt for a motor vehicle comprising:
   a profiled rail forming a base and a pair of side walls, wherein a latching contour is provided in at least one side wall of the pair of side walls,
   a sliding member which can be displaced along the profiled rail and having a latching means for latching the sliding member in the latching contour,
   a control element for releasing the latching means,
   at least one recess provided at a side edge of the sliding member, and
   the latching means includes at least one latching element which is located in the at least one recess;
   wherein, in the region of the at least one recess, the sliding member is plate-shaped having a thickness D1, and the latching element is plate-shaped having a thickness D2 which is equal to or less than the thickness D1;

wherein the at least one latching element is pre-loaded in a latching direction by a spring;
wherein the spring is in the form of a torsion spring or a leg spring with at least one radially projecting leg, wherein the torsion spring or the leg spring with at least one leg abuts against the at least one latching element.

2. A height adjuster according to claim 1 wherein the latching element is pivot-mounted in the at least one recess.

3. A height adjuster according to claim 2, wherein the latching element forms a pivot tab, and the at least one recess forms a constricted bearing, and the latching element is pivot-mounted in the bearing by the pivot tab.

4. A height adjuster according to claim 1 wherein the control element abuts against the at least one latching element with a projection, and upon actuation pushes the at least one latching element into the recess by the projection.

5. A height adjuster according to claim 4, wherein the at least one latching element at an outer surface forms a contact surface which has an inclined orientation with respect to a displacing direction of the control element and against which the control element abuts with the projection during displacement of the control element relative to the sliding member.

6. A height adjuster according to claim 1 wherein the control element is located between the base of the profiled rail and the sliding member.

7. A height adjuster according to claim 1 wherein the control element and the sliding member are located between the base of the profiled rail and a guide member which is displaceably guided along the profiled rail.

8. A height adjuster according to claim 1 wherein the at least one latching element in a latching position abuts against an edge of the recess in a force-transmitting manner.

9. A height adjuster according to claim 1 wherein in each of the pair of side walls a respective latching contour is provided, at each of the two of the side edges of the sliding member at least two of the recesses are provided, and the latching means for latching of the two side edges of the sliding member is formed by at least two latching elements located in at least two of the recesses.

10. A height adjuster according to claim 1 wherein the torsion spring or the leg spring has two radially projecting legs.

* * * * *